(12) United States Patent
Sere et al.

(10) Patent No.: US 11,030,306 B2
(45) Date of Patent: Jun. 8, 2021

(54) METHOD FOR EXECUTING A PROGRAM INTENDED TO BE INTERPRETED BY A VIRTUAL MACHINE PROTECTED AGAINST FAULT INJECTION ATTACKS

(71) Applicant: IDEMIA IDENTITY & SECURITY FRANCE, Issy le Moulineaux (FR)

(72) Inventors: Ahmadou Sere, Issy les Moulineaux (FR); Karim Madjid Ammouche, Issy les Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 326 days.

(21) Appl. No.: 15/957,855

(22) Filed: Apr. 19, 2018

(65) Prior Publication Data
US 2018/0307830 A1 Oct. 25, 2018

(30) Foreign Application Priority Data
Apr. 20, 2017 (FR) ...................................... 1753434

(51) Int. Cl.
*G06F 7/00* (2006.01)
*G06F 21/53* (2013.01)
(Continued)

(52) U.S. Cl.
CPC ................ *G06F 21/53* (2013.01); *G06F 8/61* (2013.01); *G06F 9/30058* (2013.01);
(Continued)

(58) Field of Classification Search
CPC ............. G06F 12/1441; G06F 16/2365; G06F 2009/45587; G06F 21/52; G06F 21/53;
(Continued)

(56) References Cited

U.S. PATENT DOCUMENTS

| 6,922,782 B1 * | 7/2005 | Spyker | .................... | G06F 21/52 |
| | | | | 713/161 |
| 8,281,362 B2 * | 10/2012 | Nagata | .................... | G06F 21/51 |
| | | | | 726/2 |

(Continued)

OTHER PUBLICATIONS

Preliminary Research Report received for French Application No. 1753434, dated Oct. 31, 2017, 3 pages (1 page of French Translation Cover Sheet and 2 page of original document).

*Primary Examiner* — Gary S Gracia
(74) *Attorney, Agent, or Firm* — Womble Bond Dickinson (US) LLP (57) ABSTRACT

The present invention particularly concerns a method for executing a program (P) intended to be interpreted by a virtual machine (M), the method comprising steps of determination (102) of a reference code instruction to be interpreted when executing the program, interpretation (112) by the virtual machine of the reference code instruction using machine code. This method also comprises read-out (106) of interpretation rights data (DR) indicating a portion (P1) of the program containing code instructions interpretable by the virtual machine and, on the basis of read-out data, checking the presence (110) of the reference code instruction in the portion (P1) of the program (P), the interpretation of the reference code instruction being implemented by the virtual machine (M) only if the reference code instruction is contained in the portion (P1) of the program (P).

13 Claims, 3 Drawing Sheets

(51) Int. Cl.
*G06F 16/23* (2019.01)
*G06F 21/52* (2013.01)
*G06F 8/61* (2018.01)
*G06F 9/30* (2018.01)
*G06F 9/455* (2018.01)
*G06F 21/56* (2013.01)
*G06F 12/14* (2006.01)

(52) U.S. Cl.
CPC ...... *G06F 9/45558* (2013.01); *G06F 16/2365* (2019.01); *G06F 21/52* (2013.01); *G06F 21/566* (2013.01); *G06F 12/1441* (2013.01); *G06F 2009/45587* (2013.01); *G06F 2212/151* (2013.01); *G06F 2221/034* (2013.01)

(58) Field of Classification Search
CPC ............. G06F 21/566; G06F 2212/151; G06F 2221/034; G06F 8/61; G06F 9/30058; G06F 9/45558
See application file for complete search history.

(56) References Cited

U.S. PATENT DOCUMENTS

| | | | |
|---|---|---|---|
| 8,893,275 B2* | 11/2014 | Krizenecky | G06F 21/54 726/23 |
| 2006/0112241 A1* | 5/2006 | Weiss | G06F 13/1668 711/154 |
| 2011/0202739 A1* | 8/2011 | Grisenthwaite | G06F 21/52 711/163 |
| 2011/0219447 A1* | 9/2011 | Horovitz | G06F 9/45533 726/22 |
| 2011/0258397 A1* | 10/2011 | Gauteron | G06F 21/6281 711/154 |
| 2012/0117550 A1* | 5/2012 | Chamley | G06F 21/75 717/148 |
| 2012/0331307 A1* | 12/2012 | Fernandez Gutierrez | G06F 12/0897 713/190 |
| 2014/0053272 A1* | 2/2014 | Lukacs | G06F 21/53 726/24 |
| 2015/0082304 A1* | 3/2015 | Hepkin | G06F 9/45558 718/1 |
| 2016/0019058 A1* | 1/2016 | Hu | G06F 21/577 717/124 |
| 2016/0216985 A1* | 7/2016 | Tsirkin | G06F 9/45558 |
| 2016/0246633 A1* | 8/2016 | Tsirkin | G06F 3/0664 |

* cited by examiner

FIG. 4  FIG. 5  FIG. 6

METHOD FOR EXECUTING A PROGRAM INTENDED TO BE INTERPRETED BY A VIRTUAL MACHINE PROTECTED AGAINST FAULT INJECTION ATTACKS

FIELD OF THE INVENTION

The present invention concerns a method for executing a program intended to be interpreted by a virtual machine.

The present application advantageously finds application in electronic devices such as smart cards.

STATE OF THE ART

As is known per se, a fault injection attack entails perturbing the physical environment of an electronic device to obtain modification of data stored by the device. Such perturbations can be produced in different manners: variation in power voltage, variation in the clock frequency of the device, emission of electromagnetic radiation or laser, etc.

For example, these data may be code instructions of a program intended to be executed by a processor of said electronic device. In this case, fault injection amounts to injecting a malicious code.

Some programs are more particularly intended to be interpreted by a virtual machine which itself is a program executed by a processor.

The processor is able to interpret machine code. It is known that the function of a virtual machine is to interpret high-level code instructions using machine code.

A method is known from US 20110258397 to protect objects handled by a virtual machine against fault injection attacks. However, this method does not prevent the interpretation of a malicious code by a virtual machine.

Also, document U.S. Pat. No. 8,893,275 describes a method whereby it is verified that code instructions may or may not be interpreted in machine code by a virtual machine. It is proposed for this purpose, in a program intended to be interpreted by a virtual machine, to execute special instructions comprising additional security features. For example, instead of executing instruction invokespecial defined in the Java Card standard, use is made under this principle of an invokespecial_bis instruction which implements security tests. However, this method has the major drawback that it requires substantial modification of the format of program code instructions.

SUMMARY OF THE INVENTION

A goal of the invention is to prevent a virtual machine from interpreting a malicious code, without however having to modify the format of the program code instructions intended to be interpreted by said virtual machine.

In a first aspect of the invention, there is therefore proposed a method for executing a program intended to be interpreted by a virtual machine, the method comprising steps of:
  determination of a reference code instruction to be interpreted when executing the program;
  read-out of interpretation rights data indicating a portion of the program containing code instructions interpretable by the virtual machine;
  on the basis of read-out data, checking the presence of the reference code instruction in the portion of the program;
  interpretation, by the virtual machine, of the reference code instruction using machine code only if the reference code instruction is contained in the portion of the program.

The method in the first aspect of the invention may also comprise the following characteristics taken alone or in combination whenever technically possible.

In one embodiment, a presence check is implemented for each reference code instruction determined as having to be interpreted when executing the program. This has the effect of ensuring a very high security level.

In another embodiment, the method comprises verification of at least one condition which may or may not be met by the reference code instruction; the presence check is therefore only implemented if the condition is met. This allows a reduction in additional consumption of material resources when implementing the steps of the method, compared with the preceding embodiment.

In particular, the condition can be met when:
  the reference code instruction is a jump instruction from a first basic program block to another basic program block, such as a branch instruction, method invoke instruction or method return instruction; or
  the reference code instruction is a write instruction in a non-volatile memory; or
  the program being executed in an electronic device, the reference code instruction takes part in communication of data between the electronic device and another device.

These types of code instruction are particularly critical in terms of security. It is therefore particularly advantageous to limit implementation of a presence check to said code instructions.

The presence check step may or may not be implemented depending on a result of random drawing. This makes presence check unpredictable; it will therefore be more difficult for an attacker to understand and circumvent the security measures provided by the method according to the first aspect of the invention.

The method of the first aspect may further comprise steps of:
  read-out, in the interpretation rights data, of location data adapted to locate the portion of the program;
  read-out, in the interpretation rights data, of an integrity datum relating to the location data;
  integrity check of location data on the basis of the integrity datum; the reference code instruction being interpreted only if it is determined at the integrity check that the location data are intact.

These steps allow the detection of any corruption of interpretation rights data by an attacker for the purpose of circumventing the security measures provided by the method.

The interpretation rights data can form an integral part of the program and may comprise location data adapted to locate the portion of the program within the program. In this manner, these interpretation rights data can be used directly from several program installation platforms.

The method may comprise the signaling of an error when the reference code instruction is not contained in the portion of the program.

The presence check step can be implemented by the virtual machine, the virtual machine itself being executed by at least one processor. Alternatively, the presence check step can be implemented by a circuit differing from this processor (or each of these processors if several). Therefore, part of the additional workload required by the first aspect of the method is delegated to this circuit; as a result, the or each processor is able to be execute the virtual machine without any major slowing.

In a second aspect of the invention, there is also proposed a virtual machine comprising program code instructions to execute the steps of the method according to the first aspect of the invention, when this method is executed by at least one processor.

In a third aspect of the invention, there is also proposed an electronic device such as a smart card, comprising:
- at least one processor configured to execute a virtual machine according to the second aspect of the invention;
- at least one program intended to be interpreted by the virtual machine.

In a fourth aspect of the invention, there is also proposed a method to install a program in a non-volatile memory, intended to be interpreted by a virtual machine, the method comprising steps of:
- splitting the program into a first portion comprising code instructions interpretable by the virtual machine and a remaining portion;
- reading interpretation rights data, indicating to the virtual machine that only code instructions contained in a predetermined region of the non-volatile memory are allowed to be interpreted by the virtual machine using machine code;
- storing the first program portion in the predetermined region of the non-volatile memory;
- storing the remaining portion of the program in a region differing from the predetermined region.

If a portion of another program containing code instructions interpretable by the virtual machine, called third program portion, is already present in the non-volatile memory, then the first program portion can be stored adjacent to the third program portion. This allows reduced fragmentation of the non-volatile memory.

In a fifth aspect of the invention, there is also proposed an installer comprising program code instructions to execute the steps of the method according to the fourth aspect of the invention, when this method is executed by at least one processor.

In a sixth aspect of the invention, there is also proposed a method for generating a program intended to be interpreted by a virtual machine, comprising steps of:
- generating a program portion containing code instructions interpretable by the virtual machine;
- generating interpretation rights data configured to indicate to the virtual machine that only the code instructions contained in the portion of the program are allowed to be interpreted by the virtual machine using machine code to execute the program.

In a seventh aspect of the invention, there is also proposed a computer program product intended to be interpreted by a virtual machine, comprising:
- a program portion containing code instructions interpretable by the virtual machine;
- interpretation rights data configured to indicate to the virtual machine that only the code instructions contained in the portion of the program are allowed to be interpreted by the virtual machine using machine code to execute the program.

The interpretation rights data according to the seventh aspect of the invention may comprise location data adapted to locate the portion of the program within the program, and an integrity datum relating to the location data of the program portion.

In particular, the computer program product according to the seventh aspect of the invention may be a Java Card applet. In this case, the portion of the program indicated in the interpretation rights data may be a component of the applet of "method_component" type.

In addition, the interpretation rights data used in either one of the different aspects of the invention may comprise location data adapted to locate the portion of the program within the program, and the portion location data may comprise a start address of the program portion and/or an end address of the program portion.

DESCRIPTION OF THE APPENDED FIGURES

Other characteristics, objectives and advantages of the invention will become apparent from the following description that is solely illustrative and nonlimiting, and is to be read in connection with the appended drawings in which.

In all the Figures, same elements carry same references.

DETAILED DESCRIPTION OF THE INVENTION

Electronic Device Protected Against Fault Injection Attacks

Figure 1:
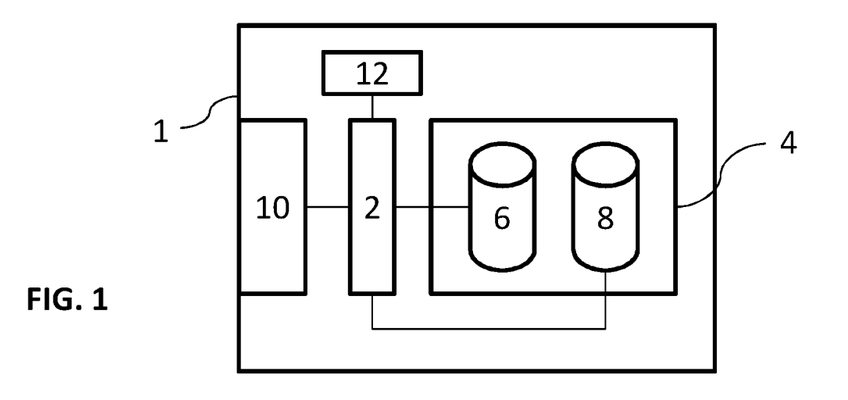
FIG. 1 schematically illustrates an electronic device according to one embodiment of the invention.

With reference to FIG. 1, an electronic device 1 comprises at least one processor 2 and at least one memory 4.

The or each processor 2 is adapted to interpret program code instructions directly belonging to a set of predetermined code instructions.

The memory 4 comprises at least one volatile memory 6, e.g. of RAM type. The function of the volatile memory 6 is to temporarily store data in memory, e.g. data computed by the processor 2. The content of the volatile memory 6 is erased when the electronic device 1 is switched off.

The memory 4 also comprises at least one non-volatile memory 8 (NVM) e.g. of hard disk, SSD, flash, EEPROM type, etc. The function of the non-volatile memory 8 is to store data persistently in memory i.e. if the electronic device 1 is switched off, the content of the non-volatile memory 8 is not erased.

The electronic device 1 additionally comprises a communication interface 10 with a third-party device external to the electronic device 1. This communication interface 10 may comprise a wireless communication circuit e.g. a NFC chip to set up a radio communication channel between the electronic device and the third-party device, and/or it may comprise at least one port intended to be placed in physical contact with at least one port of the third-party device so that data carrying electric signals are able to be transferred between the physically contacted ports.

The electronic device may also comprise a control circuit 12 separate from the processor 2, the function of which is described further on.

For example, the electronic device 1 is a smart card such as a SIM card. The third-party device may be a user terminal for example such as a smartphone.

Figure 2:
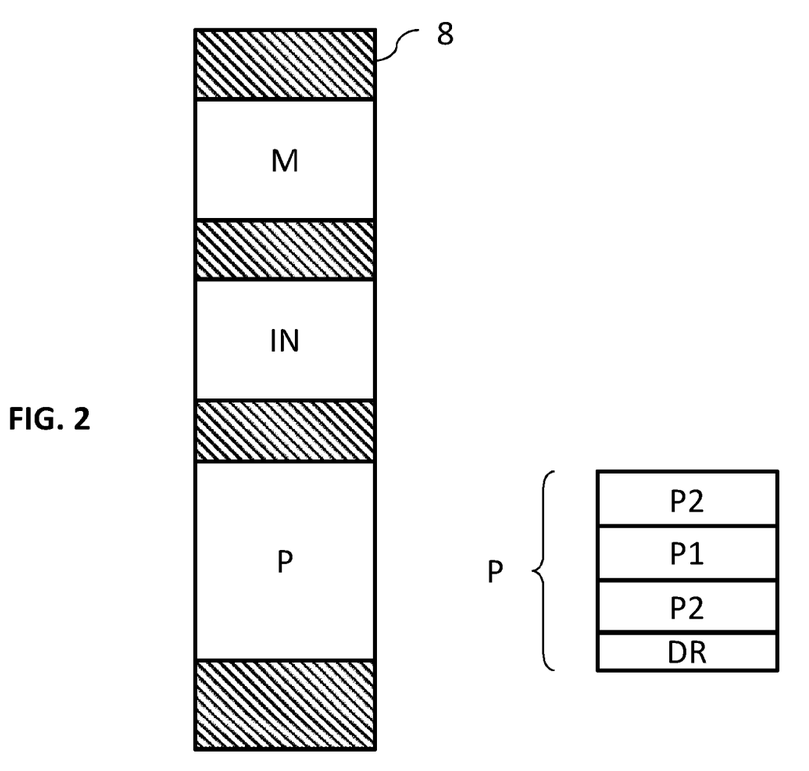
FIG. 2 schematically illustrates a memory of the device schematically illustrated in FIG. 1, containing several programs.

With reference to FIG. 2, a virtual machine M is stored in the non-volatile memory 8.

The virtual machine M is a program comprising machine code and therefore able to be executed by at least one processor 2.

The function of the virtual machine M is to use machine code to interpret high-level code instructions belonging to a set of instructions differing from the set of machine code instructions.

In the remainder of the present document, the term "code instruction" implicitly designates a high-level code instruction intended to be interpreted by the virtual machine M, whilst "machine code" designates one or more low-level code instructions directly interpretable by the or each processor.

It will be seen in the remainder hereof that the non-volatile memory 8 is also able to store at least one program P, called target program P, intended to be interpreted by the virtual machine M.

In the remainder hereof, the nonlimiting example will be taken of a Java Card virtual machine M. It is then configured to interpret "bytecode" of an applet previously generated from a source code in Java programming language which is an object-oriented programming language.

Also stored in the non-volatile memory 8 is an installer IN of programs interpretable by the virtual machine M.

The installer IN is itself a program able to be executed by at least one processor 2.

Generation of a Target Program P Intended to be Interpreted by a Virtual Machine M A target program P intended to be interpreted by the virtual machine M can be generated from a source code using the following steps.

The source code is written in Java programming language that is an object-oriented programming language.

The source code comprises at least one source file having a ".java" suffix.

A Java compiler known per se, on the basis of each source file, generates a corresponding class file having a ".class" suffix.

A converter also known per se, on the basis of the class files, generates at least one applet P interpretable by the virtual machine M.

The applet P comprises an applet file having a ".cap" suffix (this suffix meaning "converted applet") the content of which conforms to Chapter 6 of the "Java Card 2.1.1 Virtual Machine Specification".

In the applet file, the converter generates a first program portion P1 comprising code instructions interpretable by the virtual machine M.

The first program portion P1 is typically contained in a method_component structure detailed in Part 6.9 of said specification. The first program portion P1 may possibly be this structure or else the methods [ ] table contained in this structure.

The first portion P1 comprises at least one set of code instructions defining a method of the program, typically several sets of code instructions defining respective methods of the program.

A method may itself comprise one or more basic blocks. A basic block is composed of a single sequence of code instructions intended to be executed consecutively.

Also, the converter in the applet file generates at least one second program portion P2 not comprising a code instruction interpretable by the virtual machine M, but other types of data, e.g. constants intended to be read by the virtual machine M when executing the applet.

Non-conventionally, the converter additionally generates interpretation rights data DR. These interpretation rights data are configured to indicate to the virtual machine M that only the code instructions contained in the first program portion P1 are allowed to be interpreted by the virtual machine M using machine code to execute the program.

The interpretation rights data comprise location data adapted to locate the first portion P1 within the program.

For example, these location data comprise a start address of the first program portion P1 and an end address of the first program portion P1 (this end address possibly being replaced by a size of the first program portion P1).

The end address can be the address of the last code instruction contained in the first program portion P1, or else the address following immediately after the address of this last code instruction. In the remainder hereof, it is assumed that the end address is the address of the last code instruction contained in the first portion P1.

The start and end addresses can be addresses relative to a reference address of the program. In other words, they represent an offset between this reference address and the start or end of the first portion P1 in the program. Alternatively, the start and end addresses can be absolute addresses in the non-volatile memory 8.

The interpretation rights data DR also comprise an integrity datum relating to the location data.

To generate this integrity datum, the converter applies a predetermined integrity function F to the location data such as a hash function, a function generating a longitudinal redundancy check (LRC), a function generating a cyclic redundancy check (CRC), etc.

The interpretation rights data DR are stored in the program P where they can be located by the installer IN or virtual machine M.

For example, the interpretation rights data DR are included in an applet file and comprise an identifier particular to these data enabling the virtual machine M or installer IN to distinguish these interpretation rights data from other data contained in the applet file. As a variant, the interpretation rights data are stored in a dedicated file.

The generation of the target program P is typically implemented by a device differing from the electronic device, e.g. an office computer or a server.

The Table 1 below illustrates a method example of a target program P.

TABLE 1

| Example of Java method | | |
|---|---|---|
| Java source code | Mnemonics | Byte code |
| Static short foo ( | L0: sload_0 // | 0x8000: 1C |
| short x ) | x==Localvar #0 | 0x8001: 61 05 |
| { | ifne L1 | 0x8003: 11 64 |
| if( x==0 ) | sspush 100 | 0x8005: 78 |
| return 100; | sreturn | 0x8006: 1C |
| else | L1: sload_0 | 0x8007: 04 |
| return foo( x−1 ) + | sconst_1 | 0x8008: 43 |
| 20; | ssub | 0x8009: 8B 80 00 |
| } | invokevirtual<foo> | 0x800C: 11 14 |
|  | sspush 20 | 0x800E: 41 |
|  | sadd | 0x800F: 78 |
|  | sreturn |  |

The left column in Table 1 shows the source code of a foo method in Java language. The corresponding code instructions generated by the compiler and converter found in an applet file are shown (in hexadecimal) with their respective addresses in the right column of Table 1. Each Java Card code instruction is called an "opcode" for which the value and size in number of bits are specified in the aforementioned Java Card specification. The middle column in Table 1 shows the mnemonics corresponding to these code instructions.

For example, the first code instruction defining the foo method has an opcode with a hexadecimal value of 1C (in this example, this instruction is found at the absolute address 0×8000). This opcode is called "sload_0" and, at the time of its interpretation by the virtual machine M, it loads the content of a first local variable onto the top of an execution stack managed by the virtual machine M (in this example this variable is the parameter x of the foo method).

In the remainder hereof, it is fictitiously assumed and for reasons of simplicity that the first portion P1 of the program only contains the code instructions of the foo method. The interpretation rights data therefore comprise a start address of 0×8000, an end address of 0×800F (address of the last code instruction sreturn having the hexadecimal value 78).

Installation of a Target Program P Intended to be Interpreted by a Virtual Machine M in a Memory of an Electronic Device The device 1, via its communication interface 10, receives the target program P intended to be installed. The target program P is downloaded for example from an application server by the third-party device and transferred to the electronic device 1 via this communication interface 10.

The target program P is temporarily stored in the volatile memory 6 of the electronic device 1.

The program is then stored in the non-volatile memory 8 of the electronic device 1 as is conventional.

The target program P is then ready to be executed in the electronic device 1.

The interpretation rights data can be generated by the installer IN and not by the compiler or converter. For this purpose, the installer IN uses its knowledge of the .cap format for detection in the program received via the communication interface of the first program portion P1 (the method_component). The installer IN determines the start address and end address of this first portion P1 and optionally computes the integrity datum relating to these addresses.

Execution of the Target Program by Means of the Virtual Machine

The processor 2 starts execution of the virtual machine M, for example on powering-up of the electronic device 1.

Figure 3:
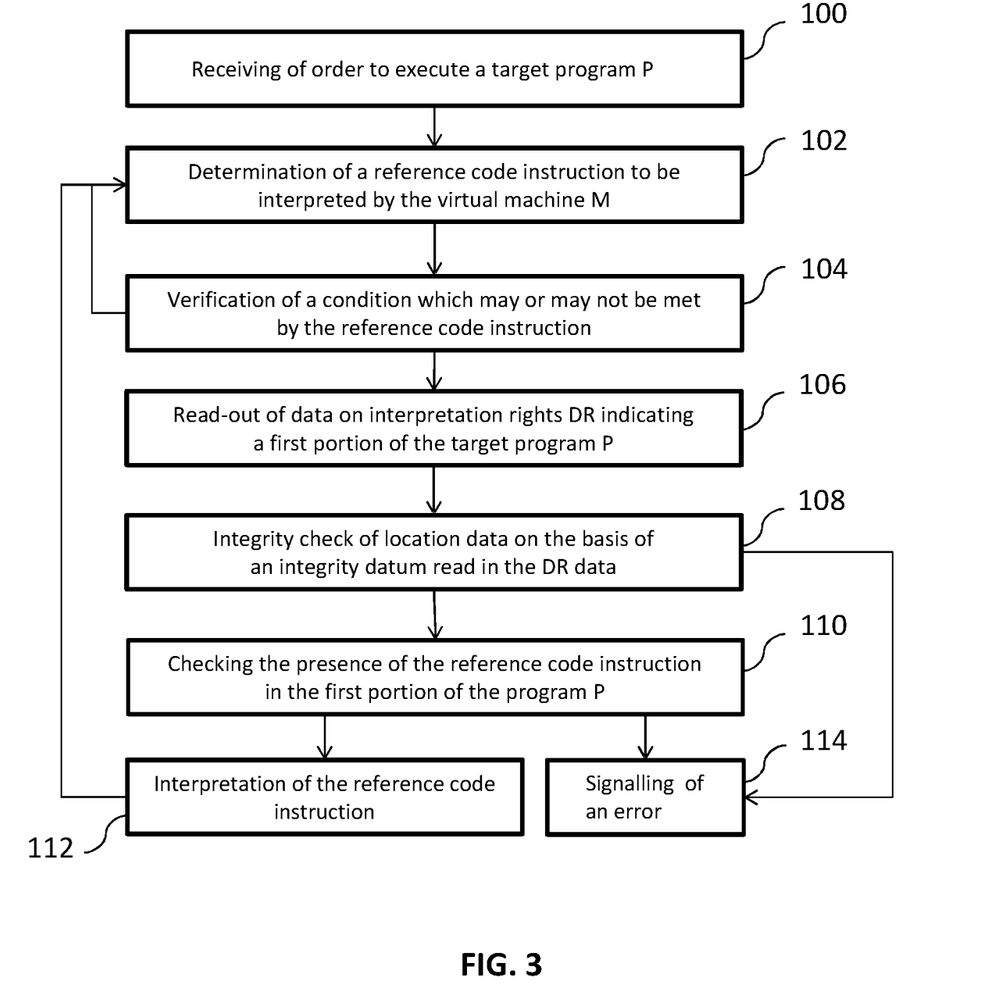
FIG. 3 is a flow chart of steps of the method to execute a program according to one embodiment of the invention.

At a later time, the virtual machine M receives an order to launch the target program P (step 100). It is considered herein that execution of the target program P is initiated when an execution order of this program is received within the electronic device 1.

The virtual machine M opens an applet file of the target program P to locate therein the first program portion P1 containing the program code instructions to be interpreted.

The virtual machine M has a Program Counter (PC) to index the bytecode, and a stack. This stack is addressed via a Stack Pointer (SP).

To execute a method, the virtual machine M allocates a region of the volatile memory 6 reserved for the method, this region being called a frame. The size of the frame corresponds to the number of words useful for storage of context information, method arguments and the number of stack locations needed for execution of all the code instructions (opcodes) belonging to the method.

Next, for each opcode of the method, the virtual machine M unstacks the elements required for execution of this opcode on the basis of its arguments, and then stacks the corresponding result in the stack. The virtual machine M then updates the PC before moving on to interpretation of the following instruction.

When executing the target program P, the virtual machine M determines a reference code instruction to be interpreted using machine code (step 102).

This determination 102 comprises read-out of an address in the program counter PC: the reference code instruction to be interpreted is found at this address.

The virtual machine M also locates the interpretation rights data DR of the target program P and reads the content thereof (step 106). The virtual machine M particularly reads the location data.

On the basis of the interpretation rights data DR that have been read, the virtual machine M checks whether or not the reference code instruction is contained in the first portion P1 of the target program P (step 110).

The checking step 110 first comprises a comparison between the program counter (i.e. the address of the reference code instruction in the program counter) and the start address read in the location data. The checking step 110 also comprises a comparison between the program counter and the end address read in the location data.

The code instruction is contained in the first portion P1 of the target program P whenever:
  the address of the reference code instruction is equal to or higher than the start address; and
  the address of the reference code instruction is equal to or lower than the end address (or strictly lower than the end address if the end address is the address which follows immediately after the address of the last code instruction of the first portion P1).

In a first case, it is detected during step 110 that the reference code instruction is not present in the first program portion P1. In this first case, the reference code instruction is not interpreted by the virtual machine M using machine code; instead the virtual machine M signals an error (step 114). This signaling typically comprises the throwing of a security exception by the virtual machine M.

Also, in this first case, the virtual machine M preferably stops execution of the program.

In a second case, it is detected during step 110 that the code instruction is indeed present in the first program portion P1. In this second case, the reference code instruction is interpreted by the virtual machine M using machine code (step 112). This interpretation step 112 is known to a person skilled in the art. For a code instruction that is read in an applet file, one or more corresponding machine code instructions are executed by the processor 2.

Also, in the second case, the virtual machine M then updates the program counter PC and determines a following code instruction to be executed, by repeating step 102.

The checking step 110 may relate to several code instructions determined as having to be interpreted by the virtual machine M when executing the program. The manner in which this checking step 110 is repeated can be the subject of several variants.

In a first variant, the checking step 110 is repeated for each code instruction determined as having to be interpreted when implementing step 102, i.e. on the basis of each new address loaded into the program counter throughout this execution.

The foo method detailed in Table 1 is interpreted in the following manner by the virtual machine M in this first variant (the bold lines represent non-conventional processing implemented by the virtual machine M, whilst the other lines represent conventional processing):

1. The virtual machine M creates a frame for the foo method.
2. The virtual machine M loads the address 0x8000 in the PC.
3. The virtual machine M verifies that the PC is included between 0x8000 and 0x800F; in the affirmative, it continues interpretation; otherwise the virtual machine M throws a security exception.
4. The virtual machine M executes the opcode sload_0 which loads the content of the first local variable onto the top of the stack, here it is parameter X of the foo method.
5. The virtual machine M increments the PC by 1, which then assumes the value 0x8001.
6. The virtual machine M verifies that the PC is included between 0x8000 and 0x800F; in the affirmative, it continues interpretation; otherwise the virtual machine M throws a security exception.
7. The virtual machine M executes the opcode ifne to test whether the value at the top of the stack is equal to 0.
8. In the affirmative, the virtual machine M increments the PC by 2 and
9. Otherwise the virtual machine M adds to the PC the value of the argument of the opcode ifne, here 0x05, for an increase to 0x8006.
10. The virtual machine M verifies that the PC is included between 0x8000 and 0x800F; in the affirmative, it continues interpretation; otherwise the virtual machine M throws a security exception.
11. This operation is repeated until one of the sreturn opcodes of the method is encountered.
12. The virtual machine M then returns to the method which had called foo.
13. Etc.

In a second variant, the checking step 110 is carried out for a reference instruction only if this reference instruction meets at least one predetermined condition (this condition being verified at step 104). This makes it possible to reduce the load of additional computation consumed by the presence check step.

This condition can be the result of a random draw implemented for the reference code instruction. In other words, the presence check step is or is not carried out at random.

Alternatively, or in addition, the checking step 110 can be carried out when at least one of the following conditions is met:
- the reference code instruction is a jump instruction from a first basic program block to another basic program block such as a branch instruction, method invoke instruction or method return instruction; or
- the reference code instruction is a write instruction in a non-volatile memory 8; or
- the program being executed in an electronic device, the reference code instruction takes part in communication of data with a device differing from the electronic device.

These types of code instruction are particularly critical in terms of security. It is therefore particularly advantageous to limit the checking step to these types of code instruction.

The checking step 110 can be implemented by the virtual machine M. However, said presence check step consumes processor resources 2 and substantially so when checking step 110 is implemented for each reference code instruction determined as having to be interpreted by the virtual machine M in accordance with the first variant proposed above. To lighten the load of the processor 2, the checking step 110 is advantageously delegated to the control circuit 12. For example, the virtual machine M reads the location data of the first portion P1 once from the non-volatile memory 8 and transmits the start and end addresses to the control circuit 12 on launching of the target program P, before implementation of the presence check step 110. At a later time, the control circuit 12 performs the checking step 110 by comparing the program counter with the addresses it received from the virtual machine M on launching of the target program P.

Also, if the interpretation rights data DR comprise an integrity datum relating to these location data, this integrity datum is also read by the virtual machine M at step 106. The virtual machine M then checks the integrity of the location data using the integrity datum (step 108).

Integrity check 108 comprises application of the predetermined function F to the location data that have been read, to generate a second integrity datum, followed by comparison between the read integrity datum and the second generated integrity datum. If both compared integrity datums differ, then the location data are deemed to be corrupted. It is possible in particular that the electronic device 1 has been subjected to an attack resulting in corruption of the location data stored in the electronic device. In this case, step 110 is implemented. If both compared integrity datums are the same, then the location data are intact. The method then moves onto step 110.

The integrity check step 108 can be carried out before the interpretation 112 of each reference code instruction determined at step 102 as having to be interpreted. As a variant, the integrity check step 108 is implemented only when the presence check step 110 is implemented for a reference code instruction.

Other Embodiments

In the previously described embodiment, the target program P installed in the electronic device contains interpretation rights data DR that are particular thereto, and possibly even being an integral part thereof. If several target programs are installed in the device 1, each installed target program has its own DR data.

In a second embodiment that will now be described, the interpretation rights data DR are not an integral part of a target program P but are instead shared between several target programs installed in the electronic device 1. This allows limiting of additional memory consumed by the interpretation rights data DR.

Figures 4, 5:
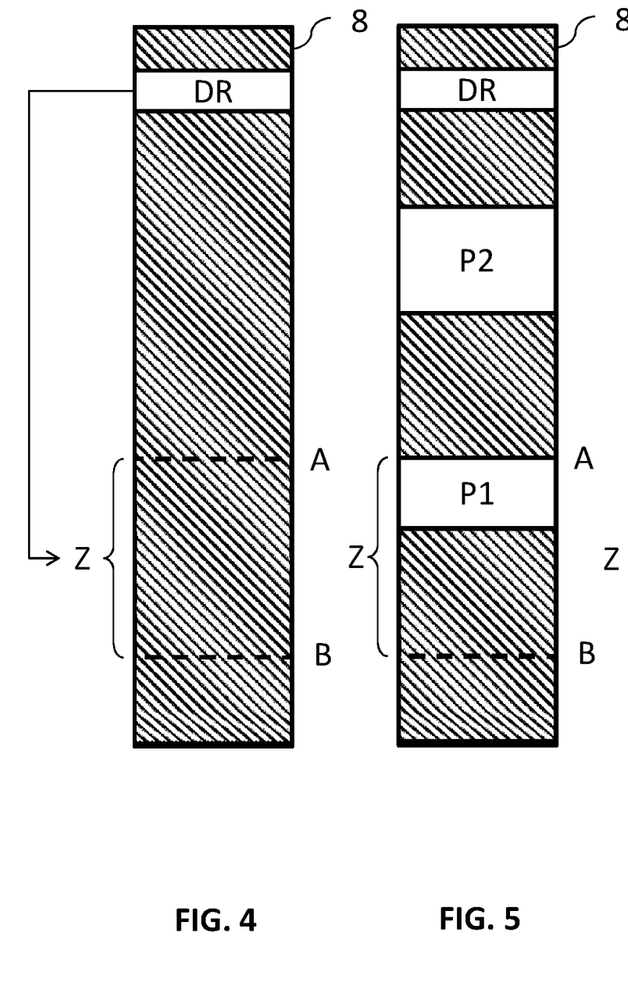
FIGS. 4, 5 and 6 illustrate the content of a memory of the device at different times throughout the implementation of a method to install a program in this memory.

With reference to FIG. 4 illustrating this second embodiment, the interpretation rights data DR indicate to the virtual machine M that only the code instructions contained in a predetermined region Z of the non-volatile memory 8 are allowed to be interpreted by the virtual machine M using machine code.

The interpretation rights data comprise location data adapted to locate the predetermined region Z in the non-volatile memory 8.

For example, these location data comprise a start address A of the predetermined region Z in the non-volatile memory 8, and an end address B of this predetermined region Z (this end address possibly being replaced by a size of the predetermined region).

The interpretation rights data DR may also comprise an integrity datum relating to the predetermined region of the non-volatile memory 8, computed in similar manner to the first embodiment.

The interpretation rights data DR are stored in the non-volatile memory 8 before installing any target program P.

It is initially assumed that the predetermined region of the non-volatile memory 8 is empty, as illustrated in FIG. 4, and that no target program P has yet been installed in the electronic device.

The installer IN splits the target program P into its first portion P1 and remaining portion P2.

The installer IN reads the interpretation rights data from the volatile memory 6 to determine the location of the predetermined region Z.

With reference to FIG. 5, the installer IN orders storage of the first program portion P1 in the predetermined region Z of the non-volatile memory 8.

The installer IN also orders storage of the remaining program portion in a region of the non-volatile memory differing from the predetermined region.

The installer IN then updates the interpretation rights data.

This updating comprises updating of the integrity value relating to this region.

If the first portion P1 of the target program P is not fully included in the predetermined region (for example because it is of larger size than the predetermined region), the region indicated in the location data is extended to cover the first portion P1. This extension typically translates as an increase in the value of the end address of the location data.

At a later time, the electronic device via its communication interface receives a second target program P to be installed, the second target program P' also being intended to be interpreted by the virtual machine M.

Figure 6:
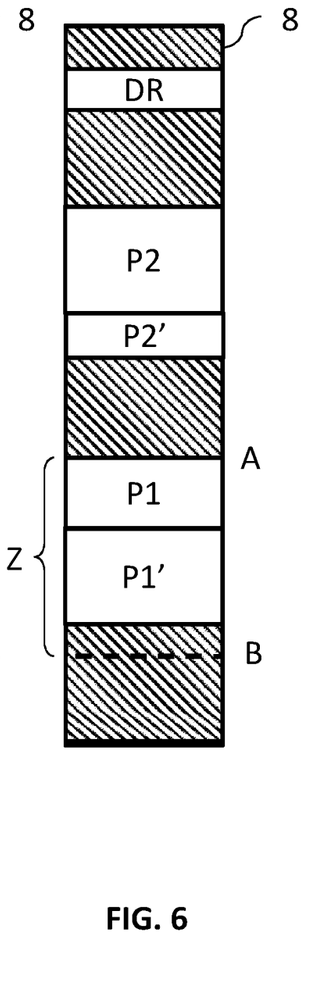

The splitting and storage steps are repeated: a first portion P1' containing code instructions of the second target program P' is stored in the predetermined region Z, and a remaining portion P2' of the second program is stored elsewhere in the non-volatile memory.

The first reference portion P1' is stored adjacent to the first portion P1 of the first target program P already present in the predetermined region of the non-volatile memory 8. This allows limiting of memory fragmentation.

If the first portion P1 of the target program P is not fully included in the predetermined region (because the accumulated size of the first portion P1 of the first target program P and first portion P1 of the second target program P is larger than the size of the predetermined region), the region Z indicated in the location data is extended to cover the two first portions P1 and P1'. This extension typically translates as an increase in the value of the end address B of the location data.

The steps of the execution method are similar to those of the first embodiment, with the exception that the data on location data are not read by the virtual machine M from a .cap file.

The invention claimed is:

1. A method comprising:
    in an electronic device comprising a hardware processor that executes a virtual machine stored in a non-volatile memory, receiving, by the virtual machine, a command to execute a target program;
    when executing the target program, the virtual machine determines a reference code instruction intended to be interpreted using machine code,
    reading interpretation rights data (DR) of the target program indicating a portion (P1) of the target program containing code instructions allowed to be interpreted by the virtual machine, wherein the portion of the target program has a range of addresses defining the portion within the target program,
    from the read interpretation rights data, checking if the reference code instruction has an address within the range of addresses, and
    interpreting, by the virtual machine, the reference code instruction using machine code executed by the hardware processor, only if the address of the reference code instruction is within the range of addresses, to prevent the virtual machine from interpreting code instructions outside the range of addresses, wherein when the reference code instruction is not within the range of addresses, signaling an error indicating a security exception by the virtual machine.

2. The method according to claim 1, wherein the checking is repeated for each reference code instruction determined as having to be interpreted when executing the target program.

3. The method according to claim 1, comprising verifying at least one condition which may or may not be met by the reference code instruction, and wherein the checking is carried out only if the condition is met.

4. The method according to claim 3, wherein the condition is met whenever:
    the reference code instruction is a jump instruction from a first basic program block to another basic program block, including a branch instruction, a method invoke instruction or a method return instruction, or
    the reference code instruction is a write instruction, or
    the target program being executed in an electronic device, the reference code instruction takes part in communication of data between the electronic device and another device.

5. The method according to claim 1, wherein the checking is or is not carried out depending on a result of a random draw.

6. The method according to claim 1, comprising steps of:
    reading, in the interpretation rights data (DR), location data adapted to locate the portion of the target program,
    reading, in the interpretation rights data (DR), an integrity datum relating to the location data,
    checking integrity of the location data from the integrity datum, wherein the reference code instruction is interpreted only if it is determined at the integrity check that the location data are intact.

7. The method according to claim 1, and wherein the checking is carried out by a circuit which is different from the hardware processor.

8. A non-transitory computer-readable medium comprising a virtual machine (M), the virtual machine (M) comprising program code instructions to execute the steps of the method according to claim 1, when the method is executed by said hardware processor.

9. An electronic device, comprising:
    a non-transitory computer-readable medium according to claim 8, the hardware processor configured to execute the virtual machine (M).

10. A method for generating a program (P) to be interpreted by a virtual machine (M), said virtual machine stored in a non-volatile memory, wherein the method comprises:
    generating a target program portion (P1) containing code instructions interpretable by the virtual machine (M) using machine code, wherein the target program portion (P1) has a range of addresses defining the portion within the target program (P);
    generating interpretation rights data of the target program configured to indicate to the virtual machine (M) that only the code instructions contained in the target program portion (P1) are allowed to be interpreted by the virtual machine using machine code executed by a hardware processor to execute the target program (P), to prevent the virtual machine from interpreting code instructions including the reference code instruction outside the range of addresses, wherein when the reference code instruction is not within range of addresses, signaling an error indicating a security exception by the virtual machine.

11. A non-transitory computer-readable medium comprising a target program to be interpreted by a virtual machine (M), the target program comprising:
   a target program portion (P1) containing code instructions including a reference code instruction interpretable by the virtual machine (M), wherein the target program portion (P1) has a range of addresses defining the portion within the target program,
   interpretation rights data (DR) of the target program configured to indicate to the virtual machine (M) that only the code instructions contained in the portion (P1) of the target program are allowed to be interpreted by the virtual machine (M) using machine code executed by a hardware processor to execute the target program only if the address of the reference code instruction is within the range of addresses, to prevent the virtual machine from interpreting malicious code instructions outside the portion of the target program, wherein when the reference code instruction is not within range of addresses, an error is generated indicating a security exception by the virtual machine.

12. The non-transitory computer-readable medium according to claim 11, wherein the interpretation rights data (DR) comprise:
   location data adapted to locate the portion within the target program, and
   an integrity datum relating to the location data of the program portion.

13. The non-transitory computer-readable medium according to claim 11, of Java Card applet type, wherein the portion of the program is a component of the applet and is of "method component" type.

* * * * *